(No Model.) 6 Sheets—Sheet 1.

G. C. PYLE.
STEAM ENGINE.

No. 444,904. Patented Jan. 20, 1891.

WITNESSES.
C. H. H. Brown.
J. Walsh.

INVENTOR
per George C. Pyle,
E. W. Bradford.
ATTORNEYS.

(No Model.) 6 Sheets—Sheet 2.

G. C. PYLE.
STEAM ENGINE.

No. 444,904. Patented Jan. 20, 1891.

WITNESSES.
C. W. H. Brown
J. Walsh

INVENTOR.
George C. Pyle,
per E. W. Bradford,
ATTORNEYS.

(No Model.) 6 Sheets—Sheet 3.

G. C. PYLE.
STEAM ENGINE.

No. 444,904. Patented Jan. 20, 1891.

(No Model.) 6 Sheets—Sheet 5.

G. C. PYLE.
STEAM ENGINE.

No. 444,904. Patented Jan. 20, 1891.

WITNESSES.
C. W. H. Brown.
J. Walsh.

INVENTOR.
George C. Pyle,
per E. W. Bradford.
ATTORNEYS.

THE NORRIS PETERS CO., PHOTO-LITHO., WASHINGTON, D. C.

(No Model.) 6 Sheets—Sheet 6.

G. C. PYLE.
STEAM ENGINE.

No. 444,904. Patented Jan. 20, 1891.

WITNESSES. INVENTOR.

UNITED STATES PATENT OFFICE.

GEORGE C. PYLE, OF INDIANAPOLIS, INDIANA, ASSIGNOR TO THE NATIONAL ELECTRIC HEAD LIGHT COMPANY, OF SAME PLACE.

STEAM-ENGINE.

SPECIFICATION forming part of Letters Patent No. 444,904, dated January 20, 1891.

Application filed June 20, 1889. Serial No. 314,968. (No model.)

*To all whom it may concern:*

Be it known that I, GEORGE C. PYLE, a citizen of the United States, residing at Indianapolis, in the county of Marion and State of Indiana, have invented certain new and useful Improvements in Steam-Engines, of which the following is a specification.

The object of my said invention is to produce a high-speed steam-engine which shall be of compact and inexpensive construction, and which shall automatically maintain a substantially unvarying speed. Said invention will first be fully described, and then pointed out in the claims.

Figure 1:
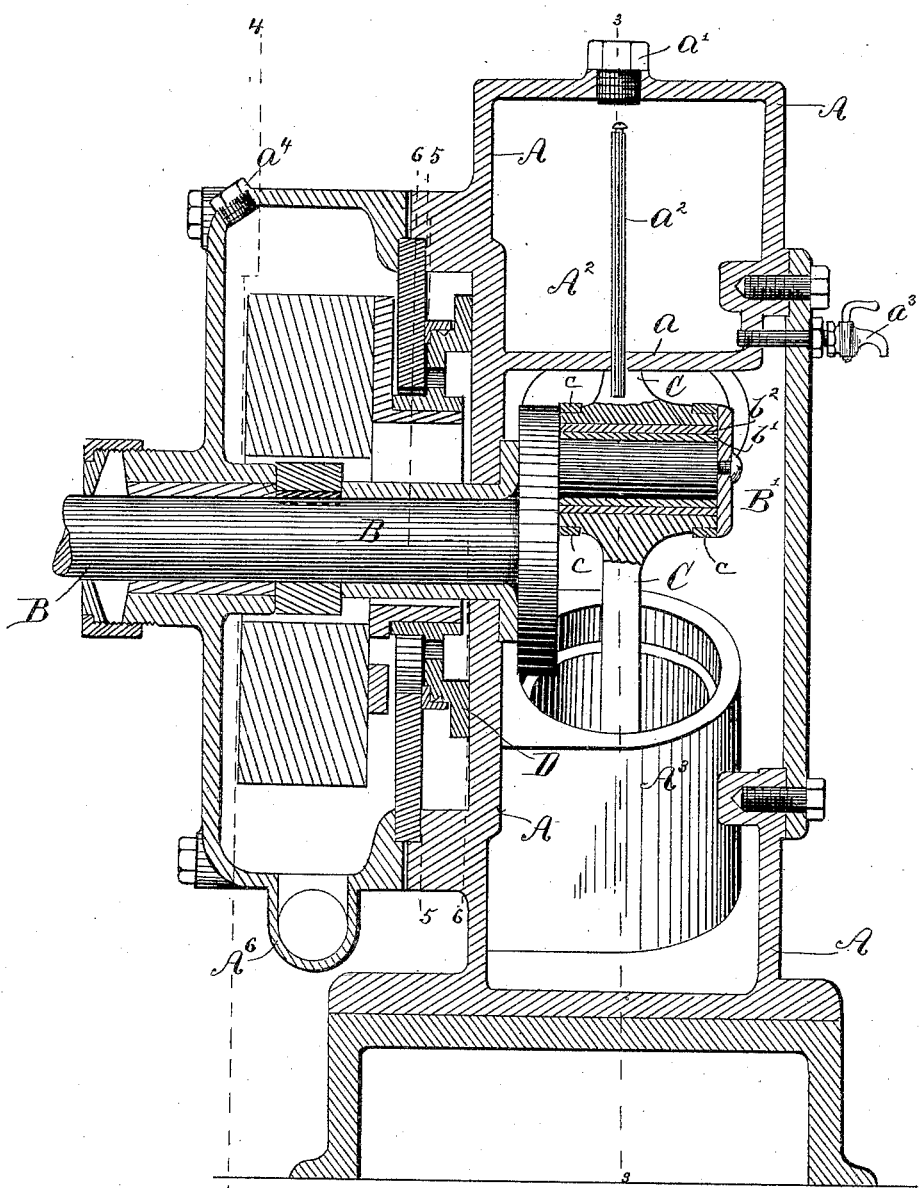
Figure 2:
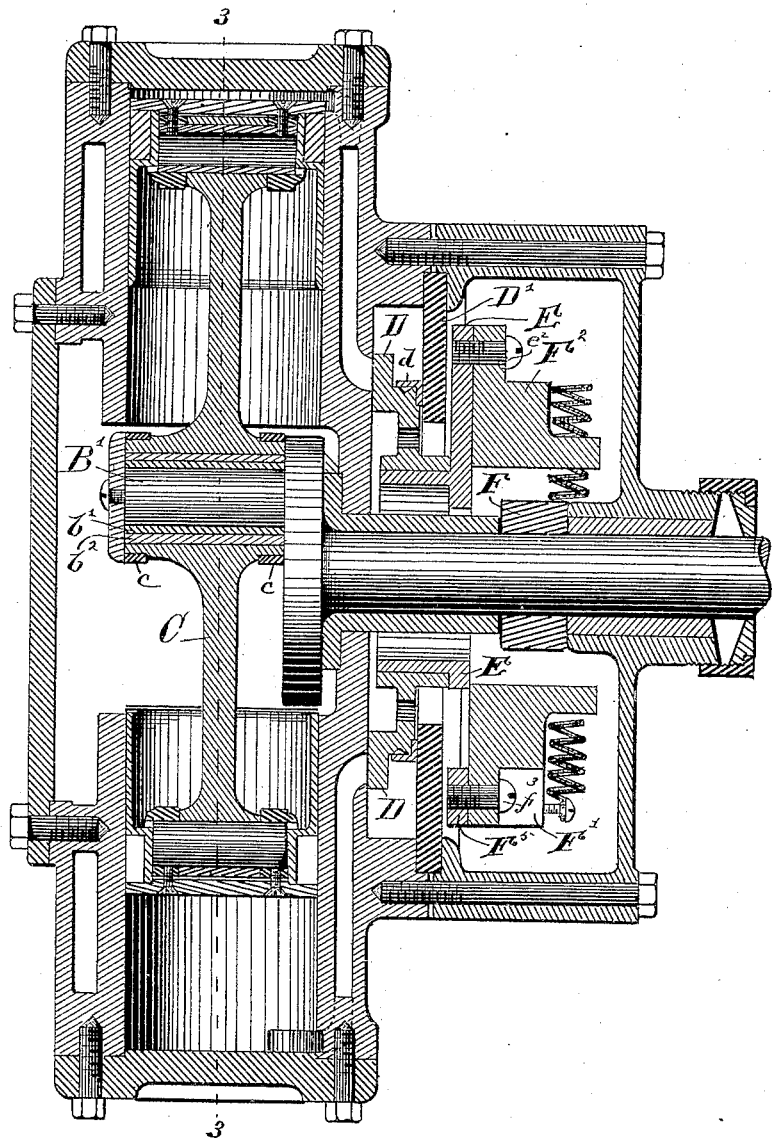
Figure 3:
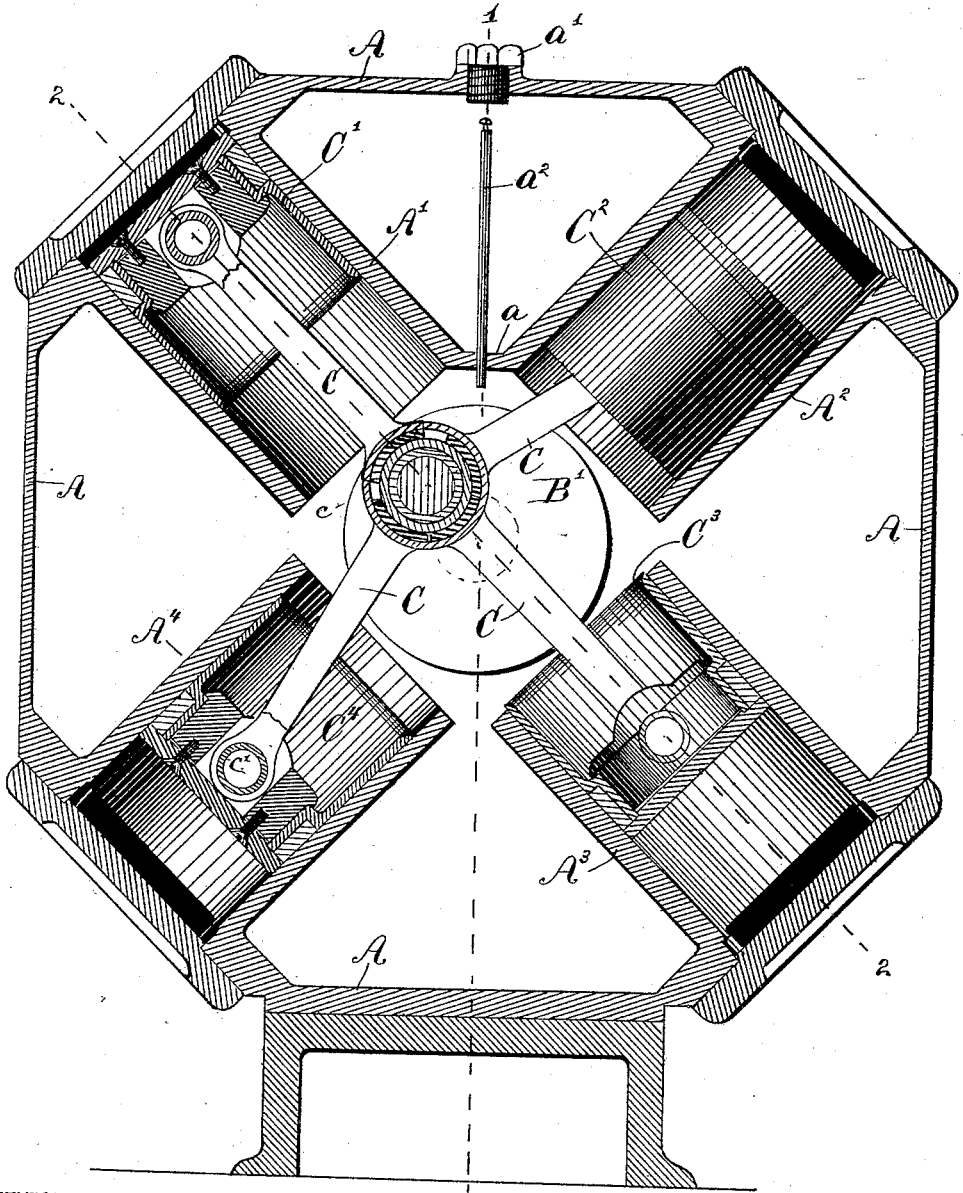
Figure 4:
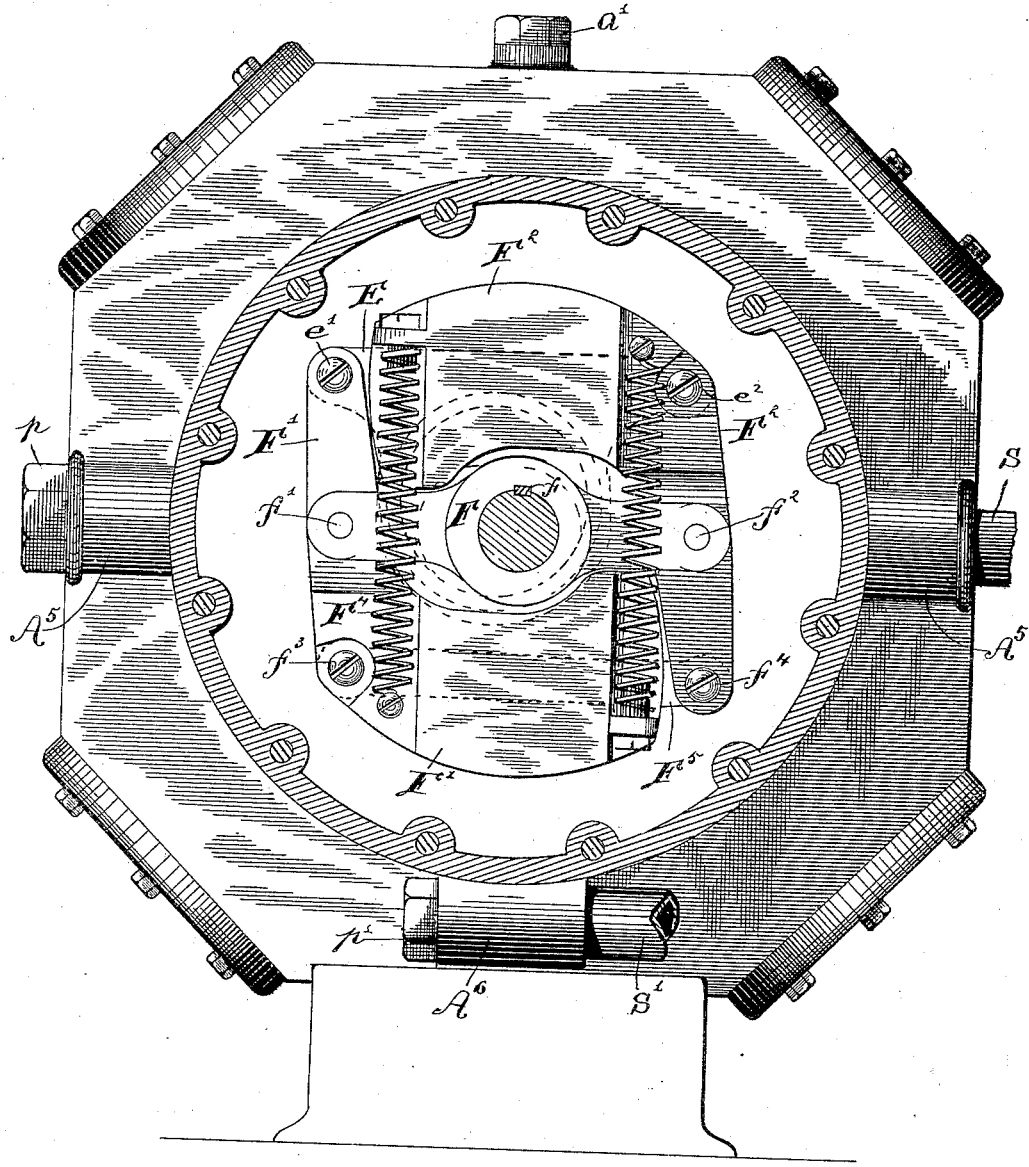
Figure 5:
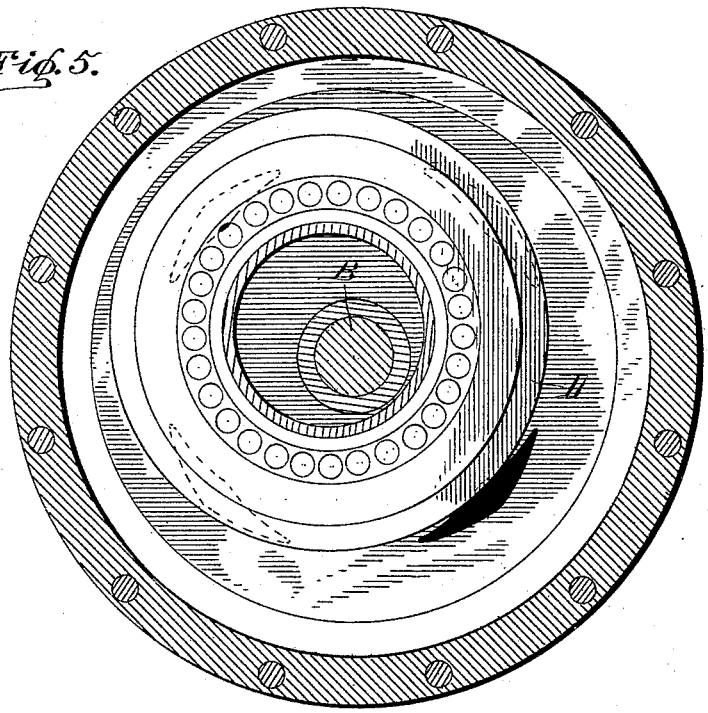
Figure 6:
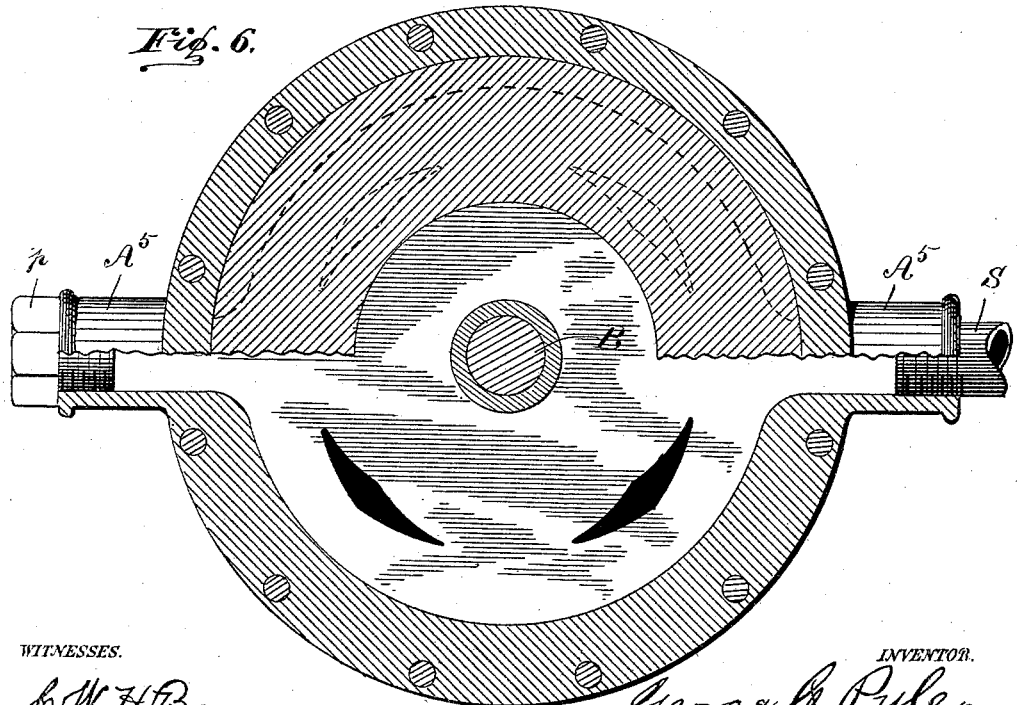

Referring to the accompanying drawings, which are made a part hereof, and on which similar letters of reference indicate similar parts, Figure 1 is a central sectional view longitudinally of the shaft, looking toward the right from the dotted line 1 1 in Fig. 3; Fig. 2, a view looking toward the left from the dotted line 2 2 in Fig. 3; Fig. 3, a vertical sectional view looking toward the right from the dotted line 3 3 in Fig. 2; Fig. 4, a similar view looking toward the right from the dotted line 4 4 in Fig. 1; Figs. 5 and 6, sectional views through the steam-chest, looking toward the right from the dotted lines 5 5 and 6 6 in Fig. 1, respectively; and Fig. 7, a plan view of the various parts composing the governor and the valve separated from each other.

In said drawings, the portion marked A represents the main casting of my improved engine; B, the shaft; $C'$ $C^2$ $C^3$ $C^4$, the pistons; D, the valve; E, a yoke by which said valve is connected to the governor, and F, F', and $F^2$ the main parts of said governor.

The casting A comprises the four cylinders $A'$ $A^2$ $A^3$ $A^4$, a casing which forms their support, and the sides of the steam-chest. The two lower cylinders are divided from the upper ones and from each other by open spaces; but the upper ones are united by a web $a$, and an inclosed cavity is thus formed, into which a supply of oil may be introduced for lubricating the machine. A hole is provided in the upper side, which is closed by a screw-cap $a'$ for the purpose of introducing this oil. Extending up to near the top of this cavity centrally is a small pipe $a^2$, which also extends through a hole in the web $a$, into which it is tightly fitted, thus locating its lower or discharging end directly above the crank-pin of the engine, so that as oil is discharged therefrom it will drop directly onto said crank-pin. The remaining spaces of the cylinders all being filled with exhaust-steam, a certain amount of said steam will find its way up said pipe to the interior of the cavity, where it will condense upon the under side of the upper wall thereof, and the water thus formed will drop down into said cavity. The oil being lighter than water, the water so introduced will go to the bottom, raising the oil, which flows over the top of the pipe and runs down slowly as it is displaced by the water. A continual automatic lubrication of the crank-pin is thus provided for, the pipe $a^2$ being just large enough for the purpose. The contents of this cavity may be drawn off through the faucet $a^3$. This lubricating device is claimed in my application, Serial No. 337,604, filed January 21, 1890.

The shaft B in itself is not peculiar. It is provided with the ordinary crank or wrist pin B', through which the pistons are connected thereto. This crank B' is provided with two sleeves $b'$ $b^2$, one outside the other, one of which is preferably formed of "metalline" or some metal which will commonly run without lubrication. I do this as an extra precaution against heating on account of the high speed at which the engine runs and the inaccessible location of this bearing, the crank being entirely inclosed in the case or frame of the engine. I have never experienced any difficulty in this regard, however, as the automatic lubrication above described has always proved sufficient; but with this arrangement the addition of bearing-surfaces serves to insure continued good results. I prefer that the sleeves should be fitted together so that there shall be operative bearing-surfaces between the inner sleeves and the wrist-pin between the two sleeves, and between the outer sleeve and the connecting-rods, as above set forth; but obviously one of the sleeves may be put in place sufficiently tight that there shall be one less of these operative bearing-surfaces without departing from my invention.

The pistons $C'$ $C^2$ $C^3$ $C^4$ are connected to the wrist-pin by connecting-rods C, as shown most plainly in Fig. 2. These connecting-rods are cast all together at first in the form of a spider having a long hub. Said hub is first fitted to the wrist-pin by being bored out to the proper size, and the outer ends of the arms are fitted to the bearings in the pistons, also by boring, as will be readily understood by an inspection of the drawings, and the hub is turned off on the outside to receive a ring or rings, as will be presently described, and is then cut apart between the arms, as shown. Being bored out when they are all together in this way insures an accurate and uniform fit upon the wrist-pin and upon the pivots by which they are connected to the pistons. After being placed in position I prefer to place thereon a ring or rings $c$, which fit onto the surfaces which have previously been turned off, and insure that the rods shall not become displaced, although as the pressure is continually against the wrist-pin from the ends of the pistons there is but little danger of this, even if said rings were dispensed with. These connecting-rods are connected to the pistons by means of large pivots $c'$, which are preferably hollow, as shown. Their size gives the large amount of bearing-surface which is desirable.

The valve D is circular in form and rests on the turned surface on the bottom of the steam-chest, where it is operated to alternately open and close the ports therein, as will be presently described. The portion which moves over the ports is in the form of a flat annular ring, the lower side of which lays flat upon the bottom of the steam-chest. Its central portion has two distinct upward projections, the first of which, or a packing-ring $d$ thereon, comes in contact with the under side of a stationary ring-like plate D', which forms the division between the live and exhaust steam spaces in the steam-chest, and the second of which is a circular flange, which engages with the yoke through which it is connected to the governor. The interior of this valve is open, and the portion between the packing and the flange has a large number of holes, through which the exhaust-steam can escape from said interior opening when said opening is over the ports during the time they are exhausting. The surface against which the packing comes is grooved in such a manner that as said packing wears it will be forced forward by the steam-pressure and kept tight at all times.

As above indicated, that space between the plate D' and that surface of the main casting A containing the ports on which the valve rests outside of said valve is the chamber into which the live steam enters. This live steam enters through a pipe S, the end of which is inserted in a boss $A^5$, formed for the purpose on the casting A. The space outside said plate D' between it and the outer wall of the steam-chest is the chamber for the exhaust-steam, and said chamber also incloses the governor. The exhaust-steam escapes through a pipe S', which enters a boss $A^6$, provided for the purpose on the side of the steam-chest, as shown most plainly in Fig. 4. The boss $A^5$ is duplicated on the opposite side of the engine for use in case it is desired to lead the steam to that side, and is closed by a plug $p$. A plug $p'$ is inserted in the duplicate opening in the boss $A^6$, which is provided for a similar purpose.

Figure 7:
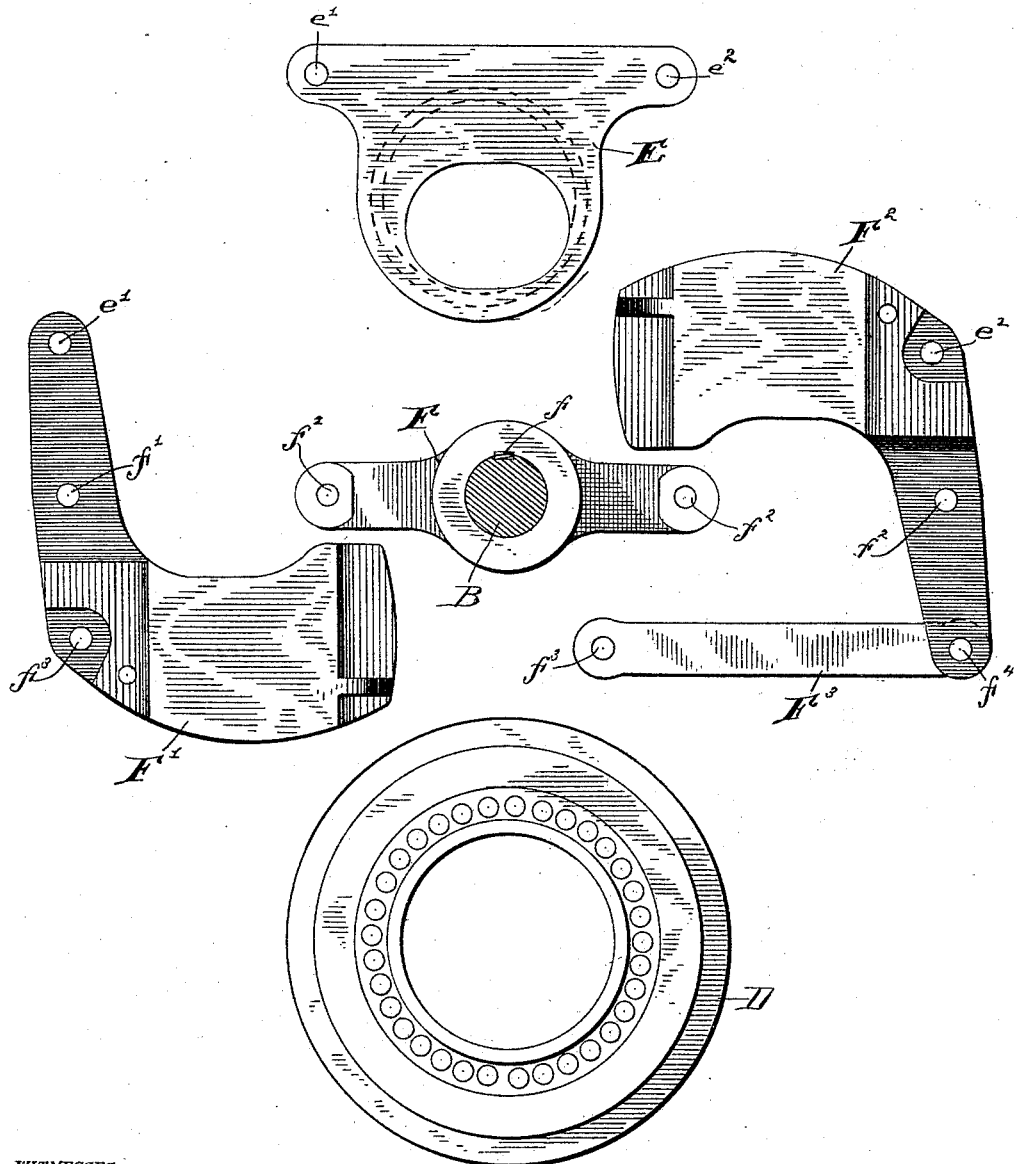

The yoke E is shown most plainly in the upper part of Fig. 7. Its position when in use is indicated by the dotted lines in Fig. 4. As shown most plainly in Figs. 1 and 2, it is provided with a flange which extends down inside the flange on the valve D, and is thus enabled to operate said valve. It is pivoted to the arms of the governor by pivots $e'$ $e^2$, being pivoted to one at its heavy or weighted end and to the other to its smaller or lighter end, as shown. It is secured eccentrically to the shaft B, so that as it revolves it moves the valve correspondingly over the surface containing the ports, thus opening and closing said ports. It is so arranged in connection with said governor that as the speed of the engine increases and the weighted portions of the governor are thus thrown out by centrifugal force its flange will be drawn more nearly concentrically to the shaft and the eccentricity of the motion of the valve thus decreased, which has the effect to open the ports less widely for the admission of live steam, thus restoring the former speed of the engine, as will be readily understood.

The governor-arms are secured by pivots $f'$ $f^2$ to the cross-bar F, which bar is rigidly secured upon the shaft B, preferably by means of a spline $f$. As will be noticed, particularly by an examination of Figs. 4 and 7, that portion of each of said arms on one side of said pivots is in the form of a weight and very heavy, while that portion on the other side of said pivots is comparatively light, and it will also be noticed that the heavy portions are arranged on the opposite sides of the bar F. At one end these arms are connected, as has already been described, by the yoke E through pivots $e'$ $e^2$. At the other end they are connected by a bar $F^3$ through pivots $f^3$ $f^4$, and these connections so unite the structure that while the parts may readily shift their position to the desired extent they cannot fly apart so as to occupy a substantially greater area at one time than another. Said governor-arms are held so that the faces of the weighted portions are made to approach each other by springs $F^4$ $F^5$, which extend across the space between them and are suitably secured to both parts. They are arranged to act oppositely to the centrifugal force which tends to throw them apart when the engine is running. All these parts are kept in continual rotation by the arm F, which, as before stated, is rigidly secured to the shaft B.

A tool-hole is provided through which the pivots may be reached by a wrench or screwdriver, and is closed when not in use by a plug $a^4$, as shown in Fig. 1.

Having thus fully described my said invention, what I claim as new, and desire to secure by Letters Patent, is—

1. The combination, in a steam-engine, of the valve D, having a flange, a yoke also having a flange which engages with the flange on the valve, said yoke being pivoted to the governor, said governor consisting of two weighted arms and a cross-arm fixed rigidly on the shaft and pivoted to said governor-arms, whereby as the speed increases said arms are thrown apart by centrifugal force and said yoke drawn in, decreasing the eccentricity of its relation to the valve and causing said valve to cut off the ports in proportion to the speed developed, substantially as set forth.

2. The combination, in an engine, of the cross-arm F, rigidly fastened to the engine-shaft, the two L-shaped arms $F'$ $F^2$, each pivoted about midway of its lighter wing to an end of said cross-arm, cross-bars connecting the extreme ends of said lighter wings to points at or near the angles of the opposite arms, and springs attached to and connecting said L-shaped arms transversely of said cross-bars, substantially as shown and described.

3. The combination, in an engine, of an arm rigidly attached to the engine-shaft, two weighted arms connected thereto, a cross-bar connecting said arms at one end, and a yoke, (which is in part also a cross-bar connecting said arms at the other end,) said yoke being provided with a ring or flange set eccentrically to the shaft when the parts are assembled and which engages with the governor, substantially as set forth.

4. The combination, in an engine, of a steam-chest having four ports therein, a valve in the form of an annular ring having a flange, and a governor having a part attached thereto, with a corresponding flange set eccentrically to the center of the steam-chest and which engages with the governor, whereby said governor is operated.

5. The combination, in a steam-engine, of the steam-chest, the main shaft passing centrally through said steam-chest, ports disposed around said shaft at equal distances therefrom, an annular valve having a flange, and a flat surface which rests on the surface containing said ports, and a governor mechanism provided with a flange, which engages with the flange on the valve, whereby said valve may be moved eccentrically to open and close said ports or to run concentrically with said shaft, closing all the ports, substantially as shown and described.

6. The combination, in a steam-engine, of an octagon casting with four cylinders cast therein, a steam-chest, four ports leading therefrom to said cylinders, and an oil-chamber in said casting between the two uppermost cylinders and said octagon-shaped casting, serving as a receptacle for oil and water to lubricate the running parts of the engine, and also as a steam-jacket on said cylinders, whereby condensation of steam therein is reduced to a minimum, substantially as shown and described.

In witness whereof I have hereunto set my hand and seal, at Indianapolis, Indiana, this 7th day of June, A. D. 1889.

GEO. C. PYLE. [L. S.]

Witnesses:
 C. BRADFORD,
 C. W. H. BROWN.